United States Patent
H'Doubler

[11] Patent Number: 5,326,096
[45] Date of Patent: Jul. 5, 1994

[54] GOLF PUTTING AID

[76] Inventor: Peter B. H'Doubler, 1965 S. Fremont, #2300, Springfield, Mo. 65804

[21] Appl. No.: 37,253
[22] Filed: Mar. 26, 1993
[51] Int. Cl.$^5$ .......................... A63B 57/00; G01C 9/00
[52] U.S. Cl. ...................................... 273/32 H; 33/382
[58] Field of Search ................ 33/381, 382, 383, 367; 273/32 H, 162 B

[56] References Cited

U.S. PATENT DOCUMENTS

| | | | |
|---|---|---|---|
| 161,155 | 3/1875 | Ransom | 33/382 |
| 613,946 | 11/1898 | Starrett | 33/382 X |
| 786,269 | 4/1905 | Curry | 33/381 |
| 3,535,792 | 7/1968 | Douglas | 273/32 H X |
| 3,751,819 | 8/1973 | Dixon | 273/32 H |
| 4,082,286 | 4/1978 | La Breche | 273/162 B |
| 4,258,475 | 3/1981 | Buckley | 273/32 H X |
| 4,260,151 | 4/1981 | Weaver | 273/32 H X |
| 4,927,151 | 5/1990 | Ronnick | 273/32 H X |
| 4,934,706 | 6/1990 | Marshall | 273/32 H X |
| 4,984,791 | 1/1991 | Labell | 273/32 H |
| 4,993,710 | 2/1991 | Marshall | 273/32 H |

*Primary Examiner*—George J. Marlo
*Attorney, Agent, or Firm*—Michael Yakimo; Jr.; D. A. N. Chase

[57] ABSTRACT

An aid for simultaneously indicating the degree of slope of lateral and longitudinal contours of a golf green relative to the straight line between ball and cup. The aid comprises a first leg extending along a straight line of ball travel and a second leg normal thereto. A pair of level gauges are positioned within a groove of each leg to indicate an uphill or downhill slope along the straight line of ball travel and/or a downhill or uphill slope lateral to the straight line of ball travel upon placement of the aid on the green. The grooves may be extended to allow for the releasable fit of additional or replacement level scopes therein in order to enhance the longitudinal and/or lateral slope measurements.

3 Claims, 3 Drawing Sheets

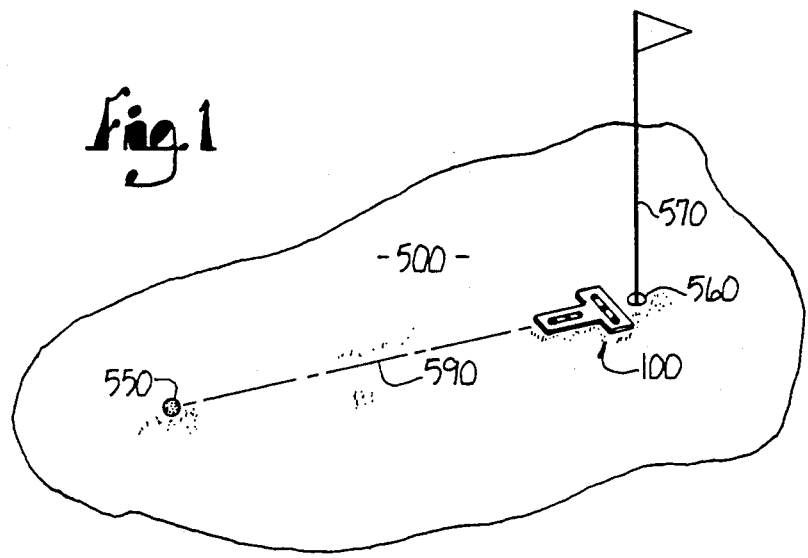
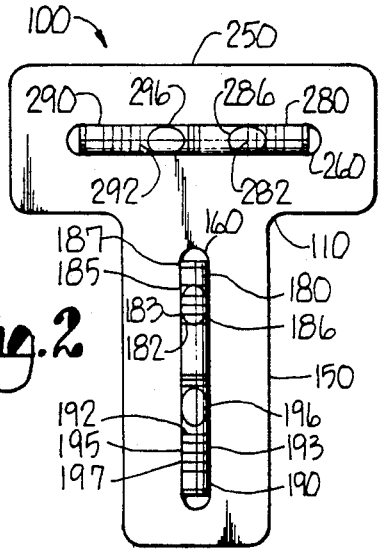
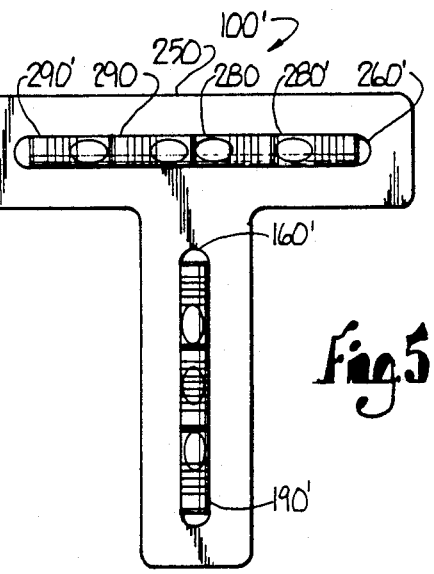
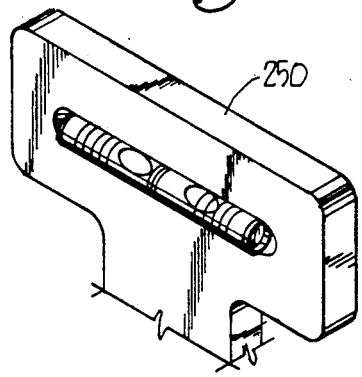

GOLF PUTTING AID

BACKGROUND OF THE INVENTION

This invention generally relates to an aid for assisting a golfer in putting and more particularly to a device for presenting to the golfer data indicative of the longitudinal and lateral slopes of a golf green relative to the golf ball and cup.

One perplexing problem, particularly facing the new and/or casual golfer, is the determination of the lateral and longitudinal slopes of the green between the ball and the cup. Once so determined, the initial direction of the putted ball can be adjusted from a straight line path so as to compensate for such contours. It is thus understood that in some cases the ball is not aimed directly at the cup due to the various green contours.

Although such slope determination can be made by visual sightings, such sightings are not always accurate particularly if such golfer is new or on an unfamiliar course.

Various devices have been proposed to assist the golfer in determining green slopes. Such devices include instruments attached to the club itself or held by the golfer. Although assumably effective in their operation, such devices are either relatively complex in configuration, cumbersome to use and/or require their attachment to the putter itself.

In response thereto I have indicated a golf putting aid for indicating the longitudinal and lateral slopes of the green to a golfer. My device is generally T-shaped in configuration having a first leg longitudinally extending between the cup and the golf ball corresponding to the latter's straight line path. A second leg traverses the first leg and this straight line path. Located within each leg and along the longitudinal center lines thereof are first and second grooves designed to receive float levels therein. The grooves are configured so as to receive the float levels either permanently or releasably therein. Accordingly, the float levels may be replaced or supplemented so as to measure the various slopes of the various greens. Such capabilities allow the putting aid to provide data to the golfer irrespective of the slope of the green. Upon placement of the aid on the green the various level gauges will tell the golfer whether the green slopes uphill or downhill and/or left or right relative to the straight line of ball travel between the ball and cup on the green.

It is therefore a general object of this invention to provide a putting aid to enhance putting accuracy.

Another general object of this invention is to provide a device, as aforesaid, which provides data to the golfer indicative of the longitudinal and/or lateral slopes of ball travel on a putting green.

A further object of this invention is to provide a device, as aforesaid, which is easily transportable by the golfer.

A still further object of this invention is to provide a device, as aforesaid, which enables the golfer to substitute and/or supplement the float levels therein according to the contours of the green or the desired data to be presented to the golfer.

Still another object of this invention is to provide a device, as aforesaid, which does not interfere with the use of the golf club proper.

A further object of this invention is to provide a device, as aforesaid, which is easy to use, economical to manufacture and effective in operation.

Other objects and advantages of this invention will become apparent from the following description taken in connection with the accompanying drawings, wherein is set forth by way of illustration and example, embodiments of this invention.

BRIEF DESCRIPTION OF THE DRAWINGS

FIG. 1 is a diagrammatic view showing the use of the device on a putting green;

FIG. 2 is a top plan view of the device shown in FIG. 1 on an enlarged scale;

FIG. 3 is a side elevation view of the device shown in FIG. 2 with a portion of the device sectioned along the center line to show the first leg groove and level gauges therein;

FIG. 4 is a perspective view of the second leg of the leveling device;

FIG. 5 is a front view of an alternative embodiment of the device wherein more than two level gauges are used;

DESCRIPTION OF THE PREFERRED EMBODIMENT

Figure 6:
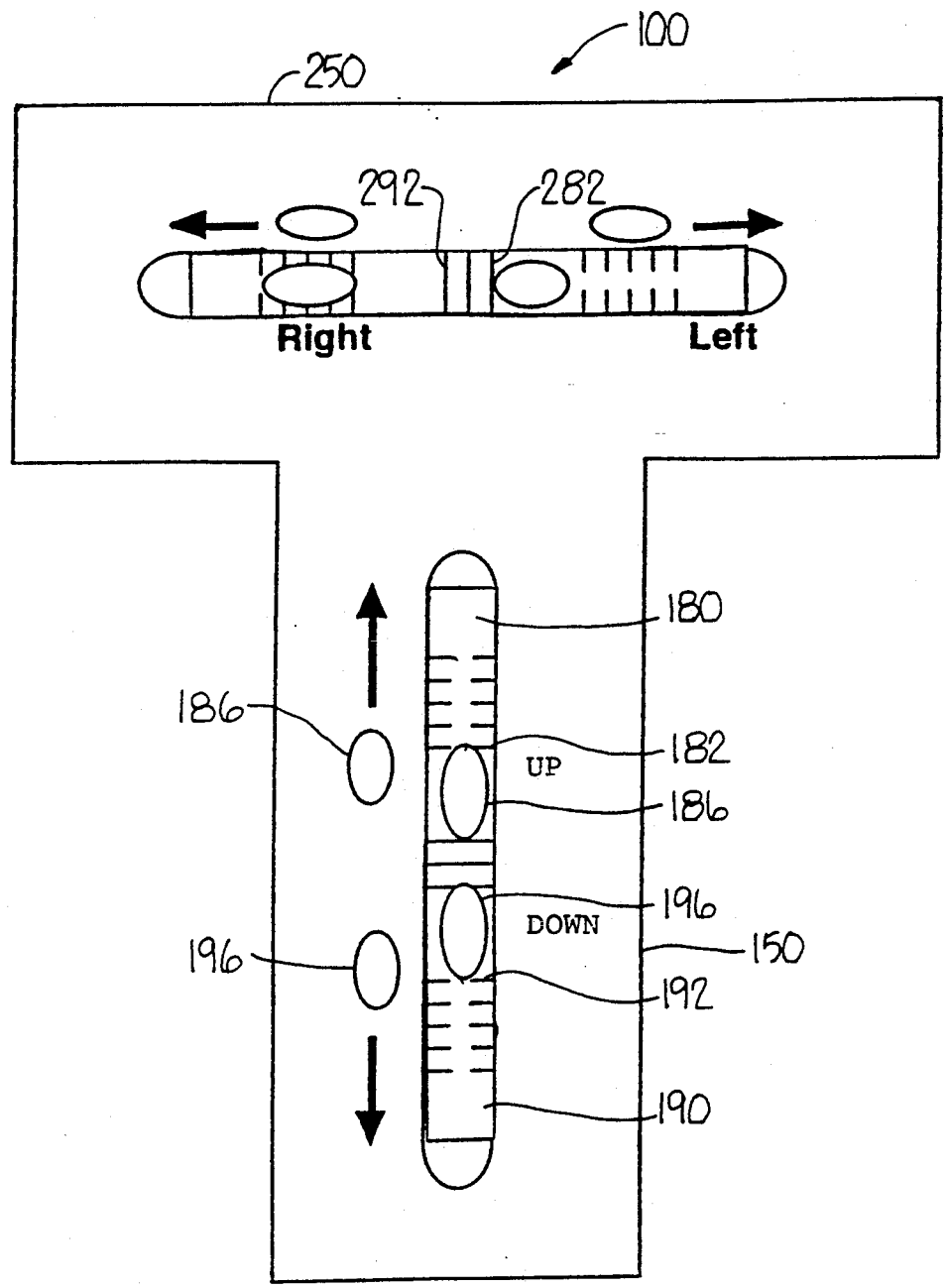
FIG. 6 is a diagrammatic view of the device showing the device as indicating, relative to the golf ball, the longitudinal slope of the green between the ball and cup to be level with the lateral slope of the green downwardly sloping to the right of the straight line of ball travel.

Turning more particularly to the drawings, FIG. 1 diagrammatically shows my aid 100 in use on a golf green 500. Shown on the golf green 500 are a golf ball 550 and cup 560 with flag 570 vertically extending therefrom. Line 590 indicates an imaginary straight line extending between the cup 560 and ball 550 which is herein referred to as the straight line of ball travel.

The aid 100 is further shown in FIG. 2 on an enlarged scale relative to FIG. 1. As shown, the aid 100 comprises a housing 110, comprising a first longitudinal leg 150 and a second coplanar lateral leg 250 generally normal thereto. Although the legs 150, 250 are shown as rigid they may be made of a flexible material to better conform to the green 500 contours.

Figure 7:
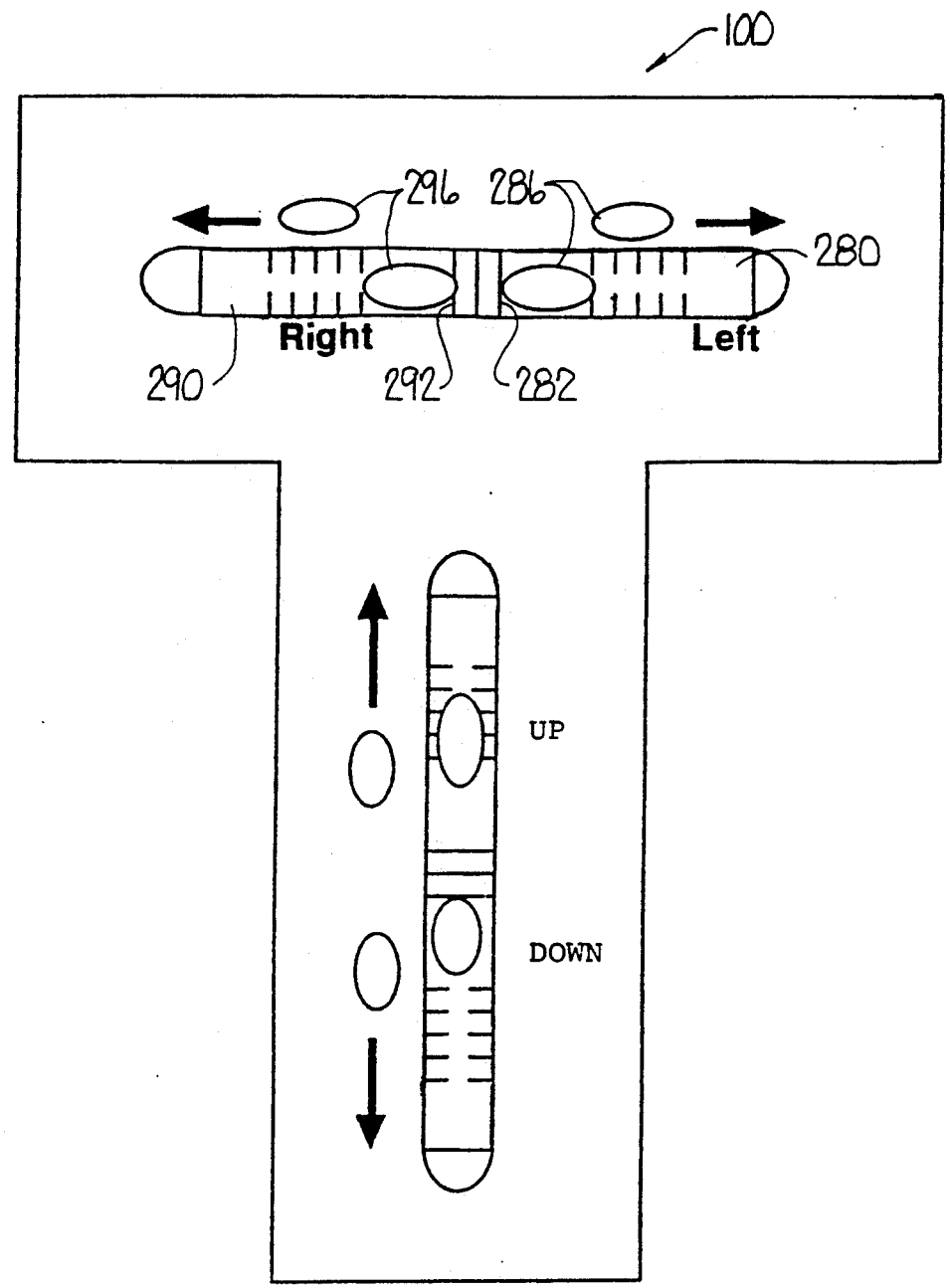
FIG. 7 is a diagrammatic view of the device showing the device as indicating, relative to the golf ball, the longitudinal slope of the green between the ball and cup to be uphill with the lateral slope, relative to the straight line of ball travel being level.

Along the imaginary longitudinal central axis of leg 150 is a groove 160. The groove 160 is configured to receive therein at least first and second float levels 180, 190 either in a permanent or releasably insertable relationship therein. Levels 180, 190 are of a conventional design and have ring-like indicia e.g. 183, 185, 187, 193, 195 and 197 thereon indicative of a degree of slope of the level, e.g. increments of ⅛ inch per foot. Thus the indicia can display selected increments per foot e.g. ⅛ inch/foot (193), ¼ inch/foot (195) and ⅜ inch/foot (197) etc. As illustrated the zero indicia or level mark is indicated in each level as 182, 192. Positioning of the leg 150 on a level surface causes the edge of each bubble 186, 196 of each level to be adjacent thereto as shown in FIG. 6. As shown, the bubble 196 in level 190 will move down the leg 150 if leg 150 is sloping downhill relative to ball 550. Thus, level 190 measures the downward slope of the leg 150 between ball 550 and cup 560. Also, bubble 186 in level 180 will travel in an opposed direction if the slope of leg 150 is uphill between ball 550 and cup 560. Thus, level 180 measures the slope of leg 150 in an uphill direction in similar inch/foot increments. As shown in FIGS. 2 and 7, leg 150 upwardly extends between the ball 550 and cup 560. FIG. 6 illustrates leg 150 as being on level ground, i.e. both bubbles 182, 192 are at their zero indicia 182, 192. Thus, leg 150 measures the longitudinal slope of green 500 between ball 550 and cup 560.

Concurrently, a groove 260 is positioned in the second lateral leg 250 along the imaginary central axis. The groove 260 receives at least a second pair of float levels 280, 290 having indicia thereon as above described. The zero or level indicia mark on each level are indicated as 292, 282. Thus, when leg 250 is on a level surface the bubbles 296, 286 will be in adjacent positions with the edges thereof being on the respective zero indicia (FIG. 7). If the slope of the leg 250 and underlying green 500 is downhill to the left of the imaginary straight line of ball travel 590, as viewed from ball 550, the bubble 286 in level 280 will travel to the right in FIGS. 6, 7. If the slope of the leg 250 and underlying green 500 is downhill to the right of the imaginary line 590, as viewed from ball 550, the bubble 296 will travel to the left in FIGS. 6 and 7. As shown in FIG. 2 the surface slopes downwardly from right to left as viewed from ball 550. Thus, bubble 296 is at the extreme right of its path within the level 290 with the bubble 286 in level 280 showing the degree of slope in inch per foot increments. FIG. 7 shows no lateral slope of the green relative to line 590 while FIG. 6 shows a downward slope to the right of line 590 as viewed from ball 550. Thus, leg 250 measures the lateral slope of green 500 relative to the straight line of ball travel 590.

An alternative embodiment 100' is as shown in FIG. 5. Therein the respective grooves 160', 260' are elongated so as to receive additional float levels 190', 280', 290' for a purpose to be subsequently described.

In use the aid 100 or 100' is placed adjacent the green 500 cup 560 with the leg 150 lying along the straight line of ball travel 590 between the cup 560 and ball 550. Upon such placement the float levels 180, 190 will indicate to the user whether the green at the cup 560 slopes downhill (190) or uphill (180). Upon reading the appropriate indicia therein the golfer will ascertain the relative degree of slope, e.g. inch per foot, according to the increments used. Concurrently, the bubble levels 280, 290 will indicate whether the green lateral to the straight line of ball travel 590 at cup 560 downwardly slopes to the left (280) or right (290) with the bubble therein indicative of the degree of slope, e.g. inch per foot. Thus, assuming FIG. 2 is a top view looking at the device 100 on the green it indicates that the green 500 upwardly slopes between the golf ball 550 and the cup 560. Green 500 further slopes downhill from the right to the left relative to the straight line of ball travel 590 as viewed from the ball 550. Accordingly, the golfer can adjust the initial path of the ball 550.

As shown in FIG. 5, the alternative embodiment allows additional float levels 282, 292 to be positioned in grooves 160', 260' preferably by a friction fit therein. Alternatively, the original float levels 280, 290 may be replaced with float levels indicating the slope in different increments, e.g. ½ inch/foot instead of ⅛ inch/foot or a greater range of increments. Accordingly, if the contours of the green 500 are such that the current levels are not adequate to provide pertinent slope information, the current levels may be removed and replaced or supplemented with other levels. Thus, the golfer may use the device 100' on various golf course greens having various slopes as measured by various level gauges. It is also understood that the aid 100/100' may be placed at other positions on the green to gauge the underlying green contours if the golfer so desires.

It is to be understood that while certain forms of this invention have been illustrated and described, it is not limited thereto except insofar as such limitations are included in the following claims and allowable functional equivalents thereof.

Having thus described the invention what is claimed as new and desired to be secured by Letters Patent is as follows:

1. A golf putting aid indicative of the inclination of a golf green to a user comprising:

a housing having first and second generally normal legs;

an imaginary central longitudinal axis in each leg, said axis of said first leg intersecting the axis of the second leg in a generally normal relationship therebetween;

an elongated groove lying along a portion of each imaginary longitudinal axis extending along each leg;

at least a first pair of float levels positioned in said groove of said first leg, one of said float levels indicative of a slope of said groove of said first leg in one direction with the other of said float levels indicative of a slope of said groove of said first leg in an opposed direction;

at least a second pair of float levels positioned in said groove of said second leg with each level being on an opposed side of the imaginary longitudinal axis of said first leg normally intersecting the axis of said second leg, one of said float levels indicative of a slope of said groove of said second leg in one lateral direction relative to the slope of said groove in said first leg with the other of said float levels indicative of a slope of said groove in an opposed lateral direction relative to the first leg groove;

indicia on each of said float levels indicative of a degree of the slope of each groove containing said float levels;

whereupon said first leg allows for a user positioning of the aid on a golf green and extension of said first leg and said groove along a line between the cup and ball with the second leg and said groove therein traversing the line with each float level of said second pair of float levels on opposed sides of the line, said first pair of float levels and indicia thereon indicative of the slope of said groove and underlying green along the line between the cup and ball with said second pair of float levels and indicia thereon indicative of the slope of said underlying green normally traversing the line, whereby to inform the user of the degree of slope of the golf green underlying said aid.

2. The device as claimed in claim 1 wherein said grooves extend beyond said pairs of float levels, said groove extension allowing for the insertion of additional float levels therein.

3. The device as claimed in claim 1 wherein said grooves are configured to allow for a releasable fit of said float levels within said grooves, said grooves allowing for the substitution of said float levels in said grooves with other float levels.

* * * * *